United States Patent
White et al.

(10) Patent No.: US 9,037,764 B1
(45) Date of Patent: May 19, 2015

(54) METHOD AND APPARATUS FOR EFFICIENTLY TRANSFERRING DATA IN BURSTS FROM A STORAGE DEVICE TO A HOST

(71) Applicant: Marvell International Ltd., Hamilton (BM)

(72) Inventors: Theodore C. White, Rancho Santa Margarita, CA (US); Stanley K. Cheong, Lake Forest, CA (US); Lim Hudiono, Laguna Nigel, CA (US); William W. Dennin, III, Mission Viejo, CA (US); Chau Tran, Huntington Beach, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/058,921

(22) Filed: Oct. 21, 2013

Related U.S. Application Data

(63) Continuation of application No. 11/872,673, filed on Oct. 15, 2007, now Pat. No. 8,572,302.

(60) Provisional application No. 60/829,449, filed on Oct. 13, 2006.

(51) Int. Cl.
  *G06F 13/12* (2006.01)
  *G06F 13/28* (2006.01)
  *G06F 11/10* (2006.01)
  *G06F 5/10* (2006.01)

(52) U.S. Cl.
  CPC ............ *G06F 13/28* (2013.01); *G06F 11/1016* (2013.01); *G06F 5/10* (2013.01)

(58) Field of Classification Search
  None
  See application file for complete search history.

(56) References Cited

U.S. PATENT DOCUMENTS

| | | |
|---|---|---|
| 5,166,936 A | 11/1992 | Ewert et al. |
| 5,179,663 A | 1/1993 | Iimura |
| 5,210,866 A | 5/1993 | Milligan et al. |
| 5,214,767 A * | 5/1993 | Wanner et al. ................. 710/22 |
| 5,220,569 A | 6/1993 | Hartness |
| 5,293,496 A | 3/1994 | White et al. |
| 5,293,621 A | 3/1994 | White et al. |
| 5,508,989 A * | 4/1996 | Funahashi et al. ......... 369/53.16 |
| 5,564,023 A * | 10/1996 | Young .......................... 710/100 |
| 5,673,415 A | 9/1997 | Nguyen et al. |

(Continued)

OTHER PUBLICATIONS

Harvey et al., "DMA Fundamentals on Various PC Platforms," Date: Apr. 1991, Publisher: National Instruments Corporation, Application Note 011, Pertinent pp. 6-7, 19 pages.

*Primary Examiner* — Henry Tsai
*Assistant Examiner* — Christopher Bartels

(57) ABSTRACT

A controller and a method for interfacing between a host and storage medium. A storage medium interface includes CH0 circuitry for performing a CH0 process to access a buffer memory on behalf of the storage medium. A host interface includes CH1 circuitry for performing a CH1 process to access the buffer memory on behalf of the host. Access to the buffer memory is arbitrated in sequential tenures to each channel of the multi-channel bus within a maximum arbitration round trip time defined by the time taken by the storage medium to move a distance corresponding to N sectors in which N is greater than one. In the CH0 tenure, the CH0 process transfers data corresponding to N sectors of the storage medium in a multi-sector burst. The length of the tenure of the CH0 channel is pre-designated so that the multi-sector burst is completed within the CH0 tenure.

18 Claims, 9 Drawing Sheets

(56) References Cited

U.S. PATENT DOCUMENTS

| | | |
|---|---|---|
| 5,758,188 A | 5/1998 | Appelbaum et al. |
| 5,768,622 A | 6/1998 | Lory et al. |
| 5,828,856 A * | 10/1998 | Bowes et al. ............... 710/308 |
| 5,915,126 A | 6/1999 | Maule et al. |
| 5,978,866 A * | 11/1999 | Nain ............................ 710/22 |
| 6,108,723 A | 8/2000 | Simms et al. |
| 6,112,261 A | 8/2000 | Simms et al. |
| 6,256,684 B1 | 7/2001 | Klein |
| 6,304,880 B1 | 10/2001 | Kishi |
| 6,330,626 B1 | 12/2001 | Dennin et al. |
| 6,336,154 B1 | 1/2002 | McCarthy et al. |
| 6,378,051 B1 | 4/2002 | Henson et al. |
| 6,393,500 B1 | 5/2002 | Thekkath |
| 6,401,149 B1 | 6/2002 | Dennin et al. |
| 6,430,652 B1 | 8/2002 | Fechser et al. |
| 6,463,483 B1 | 10/2002 | Imperiali |
| 6,487,631 B2 * | 11/2002 | Dickinson et al. ............ 711/112 |
| 6,490,648 B1 | 12/2002 | Kaneda et al. |
| 6,715,004 B1 | 3/2004 | Grimsrud et al. |
| 6,751,757 B2 | 6/2004 | Biskup et al. |
| 6,795,894 B1 * | 9/2004 | Neufeld et al. ............... 711/113 |
| 6,826,002 B2 | 11/2004 | Yanagimoto |
| 6,859,849 B2 | 2/2005 | Liang |
| 6,868,459 B1 | 3/2005 | Stuber |
| 6,948,113 B1 | 9/2005 | Shaver |
| 6,961,877 B2 | 11/2005 | Si et al. |
| 7,107,365 B1 | 9/2006 | Clark |
| 7,120,084 B2 | 10/2006 | White et al. |
| 7,130,933 B2 * | 10/2006 | Bissessur et al. ............... 710/22 |
| 7,398,335 B2 | 7/2008 | Sonksen et al. |
| 7,461,183 B2 | 12/2008 | Ellis et al. |
| 2001/0017076 A1 | 8/2001 | Fujita et al. |
| 2001/0032292 A1 | 10/2001 | Hoskins et al. |
| 2002/0057510 A1 | 5/2002 | Hoskins et al. |
| 2002/0071193 A1 | 6/2002 | Ogawa et al. |
| 2002/0122266 A1 | 9/2002 | Andoh et al. |
| 2002/0135913 A1 | 9/2002 | Yanagimoto |
| 2003/0004980 A1 | 1/2003 | Kishi et al. |
| 2003/0156338 A1 | 8/2003 | Kudo et al. |
| 2003/0182350 A1 | 9/2003 | Dewey |
| 2004/0008484 A1 | 1/2004 | Konshak et al. |
| 2004/0015743 A1 | 1/2004 | Si et al. |
| 2004/0073824 A1 | 4/2004 | Machida |
| 2004/0078508 A1 | 4/2004 | Rivard |
| 2004/0100715 A1 | 5/2004 | Smith et al. |
| 2005/0078395 A1 | 4/2005 | Chu et al. |
| 2005/0195660 A1 | 9/2005 | Kavuri et al. |
| 2005/0198413 A1 | 9/2005 | Moyer |
| 2005/0262296 A1 | 11/2005 | Peake |
| 2005/0289261 A1 | 12/2005 | White et al. |
| 2006/0023340 A1 | 2/2006 | Kim et al. |
| 2006/0111889 A1 | 5/2006 | Bress et al. |
| 2006/0129715 A1 | 6/2006 | White et al. |
| 2006/0227447 A1 | 10/2006 | Pinvidic et al. |
| 2006/0236024 A1 | 10/2006 | Saga et al. |
| 2007/0205295 A1 | 9/2007 | Tran et al. |
| 2008/0250178 A1 | 10/2008 | Haustein et al. |

\* cited by examiner

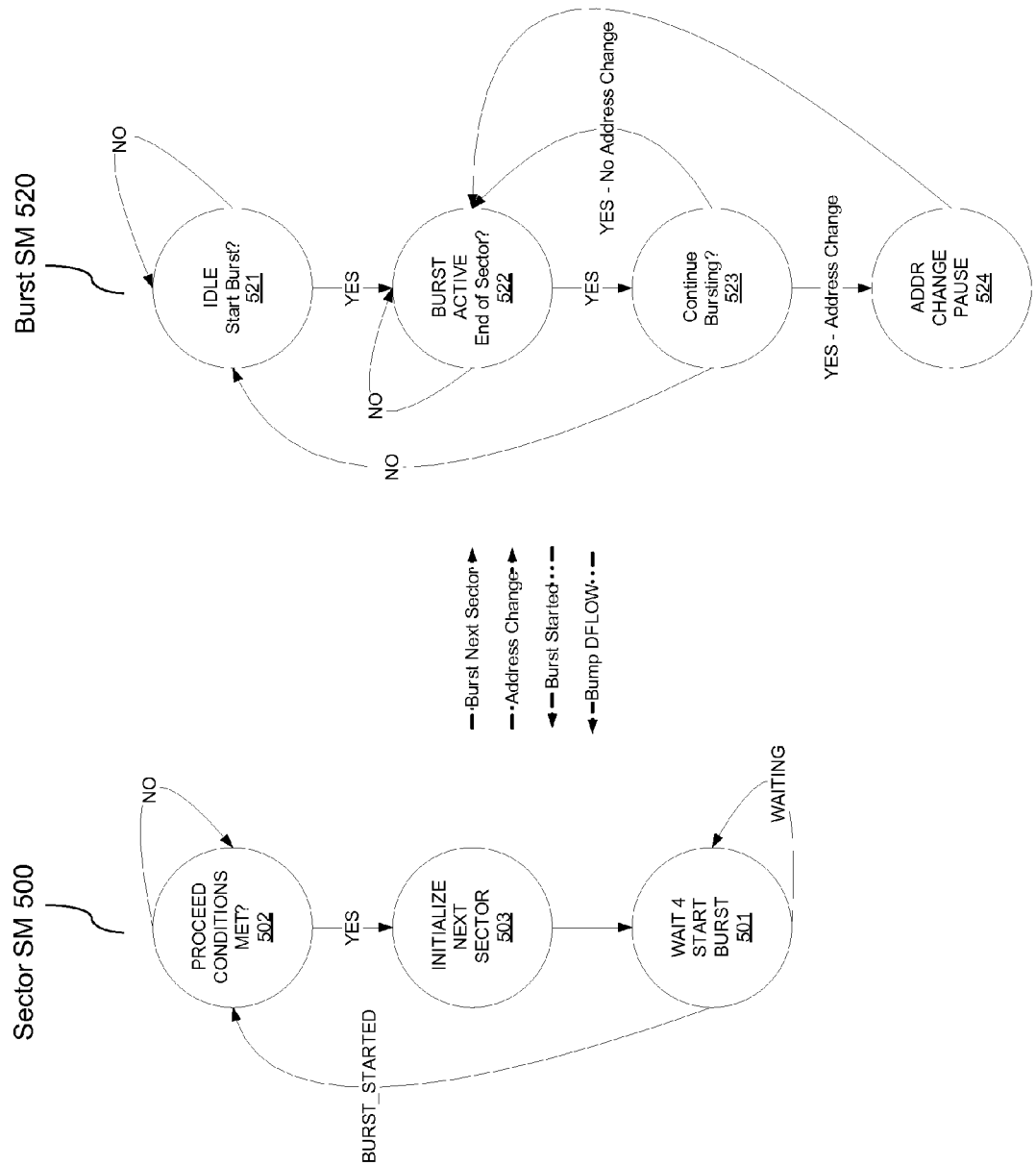

METHOD AND APPARATUS FOR EFFICIENTLY TRANSFERRING DATA IN BURSTS FROM A STORAGE DEVICE TO A HOST

CROSS-REFERENCE TO RELATED APPLICATION

The present disclosure is a continuation of and claims priority to U.S. patent application Ser. No. 11/872,673, filed Oct. 15, 2007, now U.S. Pat. No. 8,572,302 issued Oct. 29, 2013, which claims the benefit of U.S. Provisional Patent Application No. 60/829,449, filed Oct. 13, 2006, which are incorporated herein by reference.

FIELD

The present disclosure relates to storage devices, and particularly to a storage device controller with improved burst efficiency.

BACKGROUND

FIG. 1 illustrates a typical hard disk drive 1500. Hard disk drive 1500 includes hard disk controller 1502 that controls the transfer of data between moving storage medium 1506 and host 1503, such as, for example, between a magnetic surface of a moving medium and a computer. Hard disk controller 1502 typically includes a host interface 1508 for communicating with host 1503, storage medium interface 1507 for writing data to and reading data from storage medium 1506, and a memory controller 1501 for controlling access to memory 1509 via a multi-channel bus 1504.

Memory 1509 functions as a cache for information to and from host 1503, and as temporary storage for data being written to or read from medium 1506. Hard disk controller 1502 arbitrates access to memory 1509, typically through time division delegation of access to the memory to plural different circuitry, each of which accesses the memory 1509 on behalf of its client. As two examples, there is channel zero (CH0) circuitry for performing a CH0 process to access memory 1509 on behalf of storage medium 1506, and channel one (CH1) circuitry for performing a CH1 process to access memory 1509 on behalf of host 1503. The multi-channel bus 1504 includes a CH0 channel to which the CH0 circuitry is connected and a CH1 channel to which the CH1 circuitry is connected.

FIG. 2 is a time-line illustrating the arbitration performed by controller 1502. Controller 1502 uses an arbitration algorithm to prevent different processes from accessing memory 1509 simultaneously. Within each arbitration round-trip, each process is assigned a "tenure" within which the process's corresponding channel of the multi-channel bus may access memory 1509. After a channel's tenure expires, the channel does not access memory 1509 until the next arbitration round-trip. FIG. 2 depicts these tenures, 110, 111, and 112, in one arbitration round-trip. Each of tenures 110 to 112 represent a maximum amount of time within which channels CH0, CH1, and CH2, respectively, may access memory 1509 to burst data (i.e., transfer data to/from memory 1509). An additional amount of time between each tenure (e.g., 120, 121, and 122) is reserved for memory control overhead operations such as, for example, initializing memory 1509 before a burst, processing commands stored in memory 1509, refreshing memory 1509, storing state information in memory 1509 before the end of a tenure, and any other suitable memory control overhead operations.

To maintain a specified data transfer rate, channel CH0 accesses memory 1509 to retrieve (or store) additional data before storage medium 1506 moves a distance corresponding to one sector of the disk. Because the CH0 process typically bursts data corresponding to one sector of storage medium 1506, the maximum time for arbitration round-trips is equal to the time 140 for storage medium 1506 to move a distance corresponding to one sector (i.e., one disk sector cycle) to ensure that the next tenure of the CH0 channel (e.g., 110) occurs before the next sector of storage medium 1506 is ready to be accessed. If the delay 130 between CH0 channel tenures 110 is too long, the next sector is missed, and the CH0 process must wait for the sector to move back into position. The transfer rate thus decreases. Therefore, to maintain a specified data transfer rate, the arbitration round-trip time must not be greater than one disk sector cycle time 140.

SUMMARY

One problem herein is that as storage capacity increases, the amount of time in an arbitration round-trip decreases.

In one example, to accommodate increased storage capacities, the size of each sector is made physically smaller, i.e., the bit density of the storage medium is increased. Correspondingly, the sector cycle thus also decreases. As the disk sector cycle time decreases, the amount of time available for each arbitration round-trip decreases, and the maximum delay 130 between CH0 channel tenures (e.g., 110) also decreases. Because the time reserved for memory overhead operations (e.g., 120 to 122) is relatively constant and does not also decrease, the lengths of tenures 111 and 112 decrease, and there is less time for other channels (e.g., CH1 and CH2) to access memory 1509. Thus, the total burst time for all channels within each arbitration round-trip proportionately decreases, as compared to the total time for overhead operations. As a result, the ratio of total burst time to arbitration round-trip time decreases (i.e., burst efficiency decreases).

The burst efficiency can be calculated by the following equation:

$$\text{BURST EFFICIENCY} = (\text{TotalBurstTime}/\text{ArbitrationRoundTripTime}) = [(\text{ArbitrationRoundTripTime} - \text{TimeForOverheadOperations})/\text{ArbitrationRoundTripTime}] \quad \text{Equation (1)}$$

TotalBurstTime is the total amount of time during which bursting can be performed within an arbitration round-trip. ArbitrationRoundTripTime is the sum of TotalBurstTime and TimeForOverheadOperations, which is the total time during which overhead operations are performed within an arbitration round-trip.

For example, for a lower density disk, there might be 546 clock cycles available in an arbitration round-trip (i.e., ArbitrationRoundTripTime=546), with 158 clock cycles required for overhead operations, which leaves 546−158=388 clock cycles available for bursting data split amongst CH0, CH1, and CH2. Burst efficiency is therefore expected to be 388/546=71.1%.

On the other hand, for a higher density disk, if each arbitration round-trip time corresponds to one disk sector cycle having a duration of 364 clock cycles (i.e., ArbitrationRoundTripTime=364), 158 clock cycles are still required for overhead operations, leaving only 364−158=206 clock cycles (i.e., TotalBurstTime=206) for allocation among channels CH0, CH1, and CH2 to perform bursting operations. Thus, burst efficiency (i.e., TotalBurstTime/ArbitrationRoundTripTime) is expected to drop to 206/364=56.6%.

The embodiments of the present invention address the foregoing by increasing the arbitration round-trip time so that it corresponds to N sectors of the storage medium, and by bursting N sectors of disk data during the CH0 process, wherein N is greater than one, and is preferably four.

Thus, in one embodiment, a controller is provided for interfacing between a host and a moving storage medium partitioned into multiple sectors. Data is transferred to and from a storage medium through a storage medium interface. The storage medium interface includes channel zero (CH0) circuitry for performing a CH0 process to access a buffer memory on behalf of the storage medium. Data is transferred to and from the host through a host interface. The host interface includes channel one (CH1) circuitry for performing a CH1 process to access the buffer memory on behalf of the host. Access to the buffer memory is arbitrated via a multi-channel bus. The multi-channel bus includes a CH0 channel to which the CH0 circuitry is connected and a CH1 channel to which the CH1 circuitry is connected. Access to the buffer memory is arbitrated in sequential tenures to each channel of the multi-channel bus within a maximum arbitration round trip time defined by the time taken by the storage medium to move a distance corresponding to N sectors in which N is greater than one. In the CH0 tenure, the CH0 process transfers data corresponding to N sectors of the storage medium in a multi-sector burst. The length of the tenure of the CH0 channel is pre-designated so that the multi-sector burst is completed within the CH0 tenure.

Because the arbitration round trip-time corresponds to multiple sectors, and because the time required for overhead operations ordinarily does not increase significantly as the arbitration round-trip time increases, there is proportionately more time to process bursts within an arbitration round trip, as compared to the total time for overhead operations.

For example, in the above example of a higher density disk, where each arbitration round-trip time corresponds to one disk sector cycle having a duration of 364 clock cycles (ArbitrationRoundTripTime=364), and 158 clock cycles are required for overhead operations, only 206 clock cycles (i.e., TotalBurstTime=206) may be allocated among channels CH0, CH1, and CH2 to perform bursting operations, for an expected burst efficiency of 56.6% as mentioned above.

However, according to an example embodiment of the invention, if each arbitration round-trip time corresponds to four disk sector cycles, each having a duration of 364 clock cycles (i.e., ArbitrationRoundTripTime=4*364=1456), and 158 clock cycles are still required for overhead operations, 1298 clock cycles (i.e., TotalBurstTime=1298) may be allocated among channels CH0, CH1, and CH2 to perform bursting operations. Thus, burst efficiency (i.e., TotalBurstTime/ArbitrationRoundTripTime) is expected to increase to around 1298/1456=89.1%.

The multi-channel bus can be a direct memory access (DMA) bus, channel CH0 can be DMA channel 0, and channel CH1 can be DMA channel 1. The host interface can include at least Small Computer System Interface (SCSI), Fiber Channel, Serial Advanced Technology Attachment (SATA) interfaces having multiple ports. The CH0 process can transfer data between the buffer memory and a storage medium First In First Out (FIFO) queue, and transfer data between the storage medium FIFO queue and the storage medium. The CH0 process can transfer data between the buffer memory and the storage medium FIFO queue within the CH0 tenure. The storage device FIFO queue can include at least one of a Random Access Memory (RAM) module and registers capable of storing data corresponding to multiple sectors. The buffer memory can include a RAM module.

In another embodiment, a method is provided for interfacing between a host and a moving storage medium partitioned into multiple sectors. Data is transferred to and from a storage medium through a storage medium interface. The storage medium interface includes channel zero (CH0) circuitry for performing a CH0 process to access a buffer memory on behalf of the storage medium. Data is transferred to and from the host through a host interface. The host interface includes channel one (CH1) circuitry for performing a CH1 process to access the buffer memory on behalf of the host. Access to the buffer memory is arbitrated via a multi-channel bus. The multi-channel bus includes a CH0 channel to which the CH0 circuitry is connected and a CH1 channel to which the CH1 circuitry is connected. Access to the buffer memory is arbitrated in sequential tenures to each channel of the multi-channel bus within a maximum arbitration round trip time defined by the time taken by the storage medium to move a distance corresponding to N sectors in which N is greater than one. In the CH0 tenure, the CH0 process transfers data corresponding to N sectors of the storage medium in a multi-sector burst. The length of the tenure of the CH0 channel is pre-designated so that the multi-sector burst is completed within the CH0 tenure.

This brief summary has been provided so that the nature of the disclosure may be understood quickly. A more complete understanding of the disclosure can be obtained by reference to the following detailed description of the embodiments thereof in connection with the attached drawings.

BRIEF DESCRIPTION OF THE DRAWINGS

FIGS. 5A and 5B are state diagrams of a storage device interface circuit, in accordance with an example embodiment of the invention.

DETAILED DESCRIPTION

Figure 4:
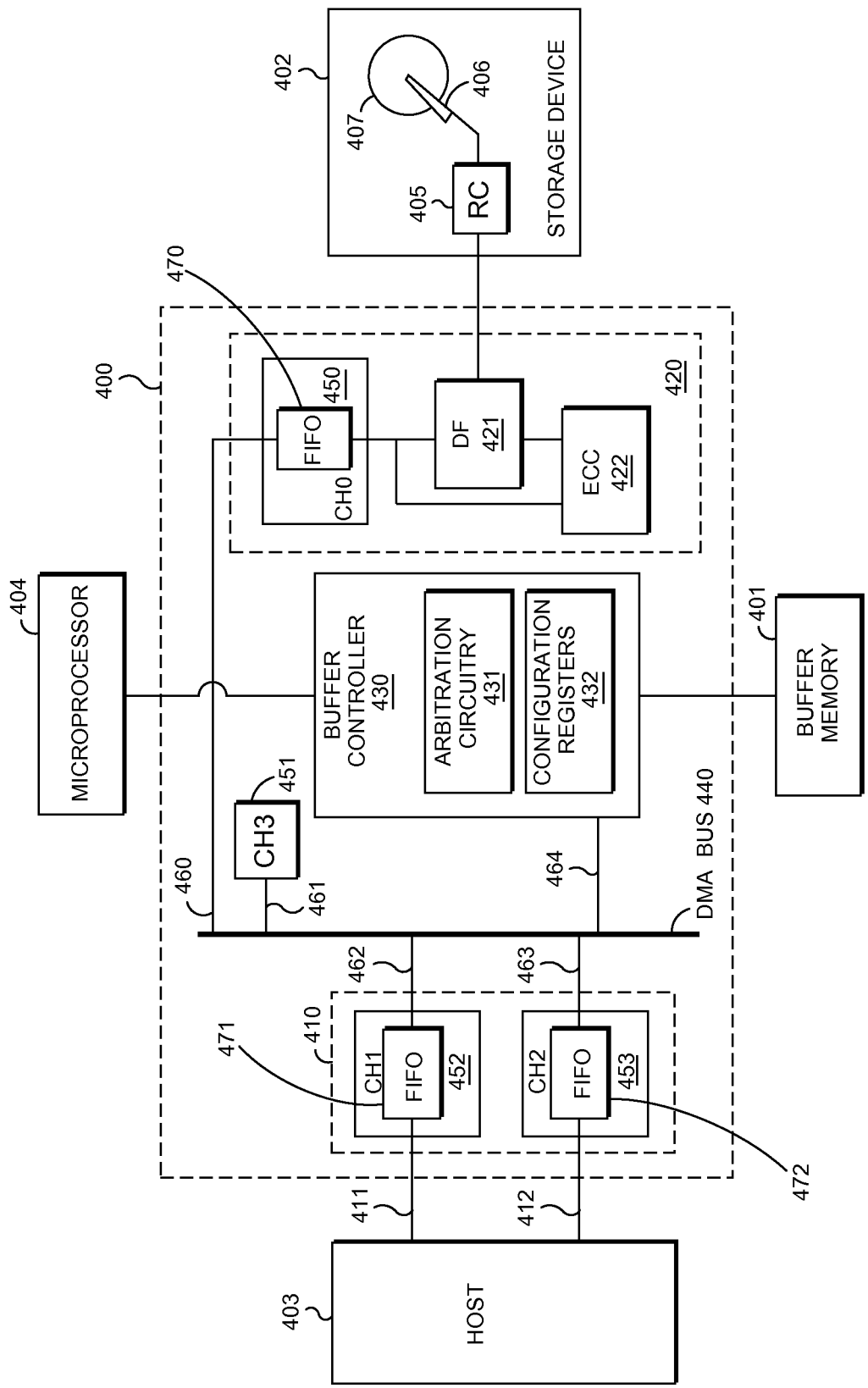
FIG. 4 is a block diagram of a storage device, in accordance with an example embodiment of the invention.

FIG. 4 is a block diagram of a controller 400 for a storage device 402, in accordance with an example embodiment of the invention.

Controller 400 is coupled to buffer memory 401, storage device 402, host 403 (e.g., a computer), and microprocessor 404. Buffer memory 401 can be, for example, a double data rate synchronous dynamic random access memory (DDR-SDRAM), a synchronous dynamic random access memory (SDRAM), or any other suitable type of memory.

Storage device 402 can be, for example, a hard disk, an optical disk, a tape drive, or any other type of storage device in which data is stored on a moveable storage medium partitioned into multiple sectors. In the example embodiment, storage device 402 includes moving magnetic storage medium 407, read/write head assembly 406, and read channel (RC) 405. Storage medium 407 is partitioned into multiple sectors. Data is read to and from storage medium 407 by read/write assembly 406, and then transferred to and from controller 400 through read channel 405.

Controller 400 includes host interface 410, storage medium interface 420, buffer controller 430, multi-channel bus 440, and channel three (CH3) circuitry 451. In the example embodiment, multi-channel bus 440 is a direct memory access (DMA) bus having four DMA channels 460 ("CH0"), 461 ("CH3"), 462 ("CH1"), and 463 ("CH2"), and DMA controller channel 464.

Host interface 410 can be, for example, a Small Computer System Interface (SCSI), Fiber Channel, Serial Advanced Technology Attachment (SATA), or any other type of interface capable of interfacing with host 403. In the example embodiment, host interface 410 includes ports 411 and 412 which are connected to host 403, but in other embodiments, host interface 410 may include any number of ports. Host interface 410 includes channel one (CH1) circuitry 452 and channel two (CH2) circuitry 453 for performing a CH1 process and a CH2 process, respectively, to access buffer memory 401 on behalf of host 403. CH1 circuitry 452 is connected to DMA channel 462, and CH2 circuitry 453 is connected to DMA channel 463. CH1 circuitry 452 and CH2 circuitry 453 include First In First Out (FIFO) queues 471 and 472, respectively. Queues 471 and 472 can be Random Access Memory (RAM) modules, registers, or any other suitable type of circuitry capable of functioning as FIFO queues. Queues 471 and 472 are capable of storing data corresponding in sizes that are not related to the size of a sector of storage medium 407, and thus can store to multiple and fractional sectors of storage medium 407.

Storage medium interface 420 includes disk formatting (DF) circuitry 421, Error Correcting Code (ECC) circuitry 422, and channel one (CH0) circuitry 450. In an example embodiment of the invention, disk formatting circuitry 421 is constructed to retrieve Data Wedge Format Table (DWFT) entries for multiple zones when transferring data corresponding to multiple sectors of storage medium 407 (i.e., during multi-sector bursts). The disk formatting circuitry 421 includes, for example, a queue that stores the retrieved DWFT entries. In an alternative example embodiment of the invention, disk formatting circuitry 421 includes, for example, a RAM or registers, that store the entire DWFT.

In this embodiment of the invention, disk formatting circuitry 421 performs a skip mask process for skipping bad sectors on storage medium 407 that can be performed during multi-sector bursts. Disk formatting circuitry 421 includes a Sector Status Queue (SSQ), and disk formatting circuitry 421 loads skip mask table entries (that identify bad sectors), from a skip mask table, for multiple sectors into the SSQ. In an alternative example embodiment of the invention, CH0 circuitry 450 retrieves skip mask table entries from the skip mask table to perform the skip mask process.

ECC circuitry 422 performs an ECC error recovery process for data transfers corresponding to multiple sectors of storage medium 407. In an example embodiment of the invention, ECC circuitry 422 performs the ECC error recovery process for each sector of transferred data independently and simultaneously. In response to detecting an error in a sector of data, ECC circuitry 422 calculates which bits in the sector of data are wrong, and stores this calculated information in an ECC corrections queue (not shown). When CH0 circuitry 450 reads data from FIFO queue 470, as will be described below, ECC circuitry 422 indicates which bits in the read data are wrong, and CH0 circuitry 450 inverts the wrong bits as the data is being read from FIFO queue 470.

ECC corrections queue is included in ECC circuitry 422, and is capable of storing data corresponding to multiple sectors of storage medium 407. In an example embodiment of the invention, the number of ECC correction queue slots can be determined by the following equation:

$$\text{ECC SLOTS} >= 2+N \qquad \text{Equation (2)}$$

In Equation 2, N is the number of sectors that are burst in one tenure of CH0. As shown in Equation 2, in addition to having one ECC correction queue slot for each sector, two ECC correction queue slots are included to account for ECC latency (in to out). In an example embodiment wherein CH0 circuitry 450 performs four-sector bursts (i.e., N=4), the number of ECC correction queue slots (i.e., ECC SLOTS) is equal to six. In an example embodiment wherein CH0 circuitry 450 performs two-sector bursts (i.e., N=2), the number of ECC correction queue slots (i.e., ECC SLOTS) is equal to four.

The size of each ECC correction queue slot is related to the maximum number of syndromes (i.e., 10-bit data units) that can have errors and still be corrected. In an example embodiment of the invention, each syndrome has a corresponding 8-bit index that identifies the syndrome's position within a sector. The ECC correction queue stores each bad syndrome (10 bits), along with its index (8 bits). In an example embodiment of the invention, this maximum number of syndromes is forty, thus, the size of each ECC correction queue slot is (BitsPerSyndrome×MaxBadSyndromes)=(10 bits+8 bits)×40 syndromes=720 bits. In other example embodiments of the invention, each ECC correction queue slot may have a different size, depending in part upon the maximum number of syndromes that can have errors and still be corrected, and the size of each syndrome.

CH0 circuitry 450 performs a CH0 process to access buffer memory 401 on behalf of storage medium 407. CH0 circuitry 450 also includes FIFO queue 470, which is similar to queues 471 and 472 as described above. In an example embodiment of the invention, the size of CH0 FIFO queue 470 can be determined by the following equation:

$$\text{FIFO SIZE} >= (2*\text{SectorSize}) + (N*\text{SectorSize}) \qquad \text{Equation (3)}$$

In Equation 3, N is the number of sectors that are burst in one tenure of CH0. In an example embodiment wherein CH0 circuitry 450 performs four-sector bursts (i.e., N=4), the size of CH0 FIFO queue 470 (i.e., FIFO SIZE) is equal to the number of bytes corresponding to six sectors. For example, if the number of bytes per sector (i.e., SectorSize) is 680, the size of CH0 FIFO queue 470 equals 4080 bytes (i.e., 6*680).

In an example embodiment wherein CH0 circuitry 450 performs two-sector bursts (i.e., N=2), the size of CH0 FIFO queue 470 (i.e., FIFO SIZE) is equal to the number of bytes corresponding to four sectors. For example, if the number of bytes per sector (i.e., SectorSize) is 680, the size of CH0 FIFO queue 470 equals 2720 bytes (i.e., 4*680).

CH0 circuitry 450 is connected to CH0 DMA channel 460, disk formatting circuitry 421, and ECC circuitry 422. ECC circuitry 422 is connected to disk formatting circuitry 421, and disk formatting circuitry 421 is connected to read channel 405 of storage device 402.

CH3 circuitry 451 can perform, for example, a Redundant Array of Independent/Inexpensive Disks (RAID) process (e.g., XOR process) on data stored in buffer memory 401.

In the example embodiment, CH0 circuitry 450, CH1 circuitry 452, CH2 circuitry 453, and CH3 circuitry 451 all perform uninterrupted bursting through sector boundaries, and buffer memory 401 is configured as a circular buffer.

The CH0 circuitry 450, CH1 circuitry 452, CH2 circuitry 453, and CH3 circuitry 451 all perform address reload processes to calculate and reload the start address of the circular buffer when the end of the circular buffer is reached. These address reload processes can calculate and reload buffer addresses during multi-sector bursts.

Buffer controller 430 performs buffer control processes such as, for example, initializing buffer memory 401 before a burst, processing commands stored in buffer memory 401, refreshing buffer memory 401, storing state information in buffer memory 401, and any other suitable buffer memory control processes. Buffer controller 430 includes arbitration circuitry 431 and configuration registers 432. Arbitration circuitry 431 performs an arbitration process that arbitrates access to buffer memory 401 via multi-channel bus 440, based on configuration data stored in configuration registers 432.

Arbitration circuitry 431 arbitrates access to buffer memory 401 in sequential tenures (i.e., periods of time) (e.g., 310 to 312 of FIG. 3) to each of DMA channels 460 ("CH0"), 461 ("CH3"), 462 ("CH1"), and 463 ("CH2") within an arbitration round-trip time. In the example embodiment, there are at most four tenures per arbitration round-trip, and the length of time for each tenure is specified in configuration registers 432. After the last tenure in an arbitration round-trip expires, a new arbitration round-trip begins, starting with the CH0 tenure. The maximum time for each arbitration round-trip to complete is defined by the time taken by storage medium 407 to move a distance corresponding to N sectors, in which N is greater than one.

In operation, to read data from storage medium 407, host 403 sends a read command to buffer controller 430 (through host interface 410 and multi-channel bus 440), and buffer controller 430 stores the read command in buffer memory 401. In response, microprocessor 404 retrieves the read command from buffer memory 401 via buffer controller 430, and initializes buffer controller 430 to perform the read operation.

Microprocessor 404 initializes arbitration circuitry 431 and configuration registers 432 (of buffer controller 430) to begin a first arbitration round-trip of the read operation, wherein the first arbitration tenure is a tenure of CH0 DMA channel 460 (i.e. a CH0 tenure). The length of the CH0 tenure is specified in configuration registers 432, which is configured by microprocessor 404. The CH0 tenure time (e.g., 310 of FIG. 3) is configured to correspond to the time required for bursting a predetermined number of sectors (e.g., four) from storage medium 407 to buffer 401.

To begin the first CH0 tenure (e.g., 310), buffer controller 430 initializes storage medium interface 420 to perform a read operation to read data from storage device 402. After storage device controller 420 is initialized, the read operation begins with read/write assembly 406 reading data for N sectors (e.g., four sectors) from moving storage medium 407, and transferring the data to disk formatting circuitry 421 through read channel 405. In response, disk formatting circuitry 421 transfers the received data to CH0 circuitry 450, which stores the data in FIFO queue 470. After FIFO queue 470 contains a predetermined amount of data (e.g., data corresponding to four sectors of storage medium 407), CH0 circuitry 450 performs a CH0 burst process that transfers the data stored in FIFO queue 470 to buffer memory 401 (through multi-channel bus 440 and buffer controller 430) in a multi-sector (e.g., four sector) burst.

After the multi-sector burst has completed, the first CH0 tenure expires, and overhead processing 120 occurs so as to clearly terminate the CH0 tenure and to start another tenure 311 from a different channel. Overhead processing 120 includes, for example, DDR-SDRAM overhead performed before data can be transferred, and performed after data is transferred to provide a clean transfer termination.

During other tenures (e.g., 311 and 312), CH0 circuitry 451 works independently of access to memory 401, and may, for example, continue storing data received from disk formatting circuitry 421 in FIFO queue 470. For example, in an example embodiment of the invention that performs four-sector bursts, for a read request of more than four sectors, disk formatting circuitry 421 continues transferring data received from read channel 405 to CH0 circuitry 450 until all the requested data is read from storage medium 407.

After tenure CH0 expires, and during overhead processing 120, circuitry of buffer controller 430 (e.g., arbitration circuitry 431) is initialized to begin a second tenure (e.g., a CH1 or a CH2 tenure) during which circuitry of host interface 410 (e.g., 452 or 453) performs a process (e.g., a CH1 or a CH2 process) to transfer the data (corresponding to the multi-sector CH0 burst) stored in buffer memory 401 to host 403. To begin the second tenure (e.g., 311), buffer controller 430 initializes host interface 410 (during, e.g., time 120 of FIG. 3) for transferring data from buffer memory 401 to host 403.

For example, during a CH1 tenure, CH1 circuitry 452 performs a CH1 burst process that transfers the data (corresponding to the CH0 burst) stored in buffer memory 401 to FIFO queue 471 (through multi-channel bus 440 and buffer controller 430) until either all of the data is transferred, or the CH1 tenure expires. The lengths of the tenures other than the CH0 tenure are configured such that the maximum arbitration round-trip time is less than (or equal to) the time taken by storage medium 407 to move a distance corresponding to N sectors in which N is greater than one.

Also during the CH1 tenure, and/or after the CH1 tenure expires, circuitry of host interface 410 transfers data stored in FIFO queue 471 to host 403 via port 411.

Similarly, during a CH2 tenure, CH2 circuitry 453 performs a CH2 burst process that transfers the data stored in buffer memory 401 to FIFO queue 472 until either all of the data is transferred, or the CH2 tenure expires. Also during the CH2 tenure, and/or after the CH2 tenure expires, circuitry of host interface 410 transfers data stored in FIFO queue 472 to host 403 via port 412.

Figure 1:
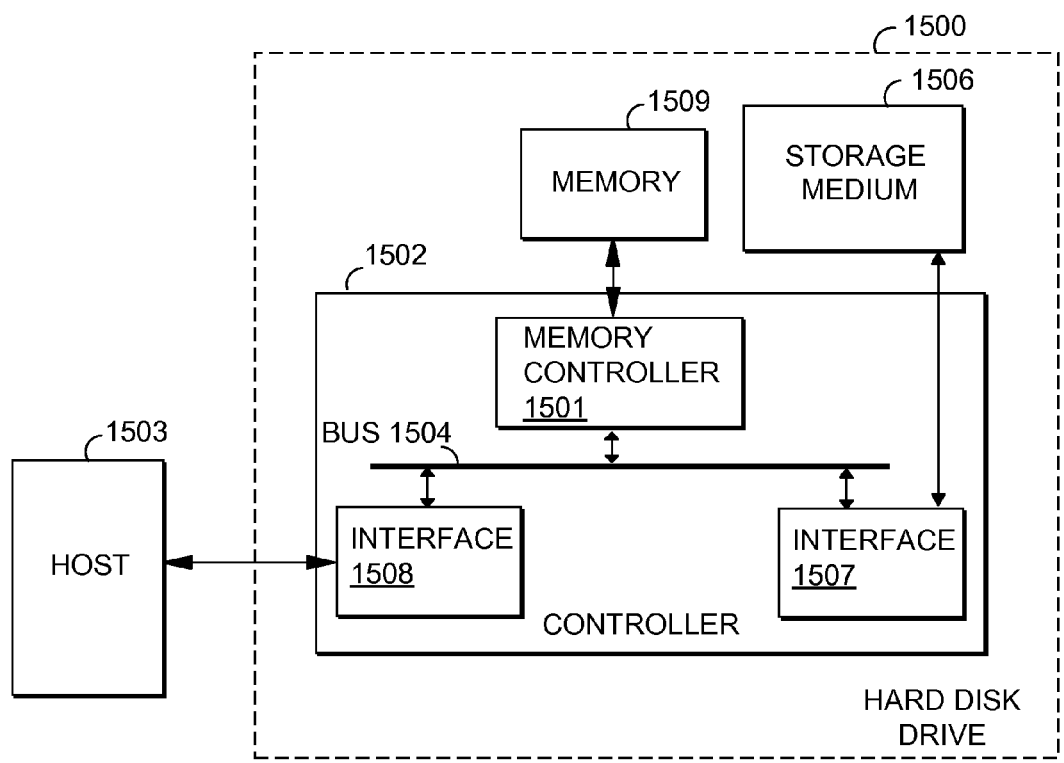
FIG. 1 is a block diagram of a conventional hard disk drive.
Figure 2:
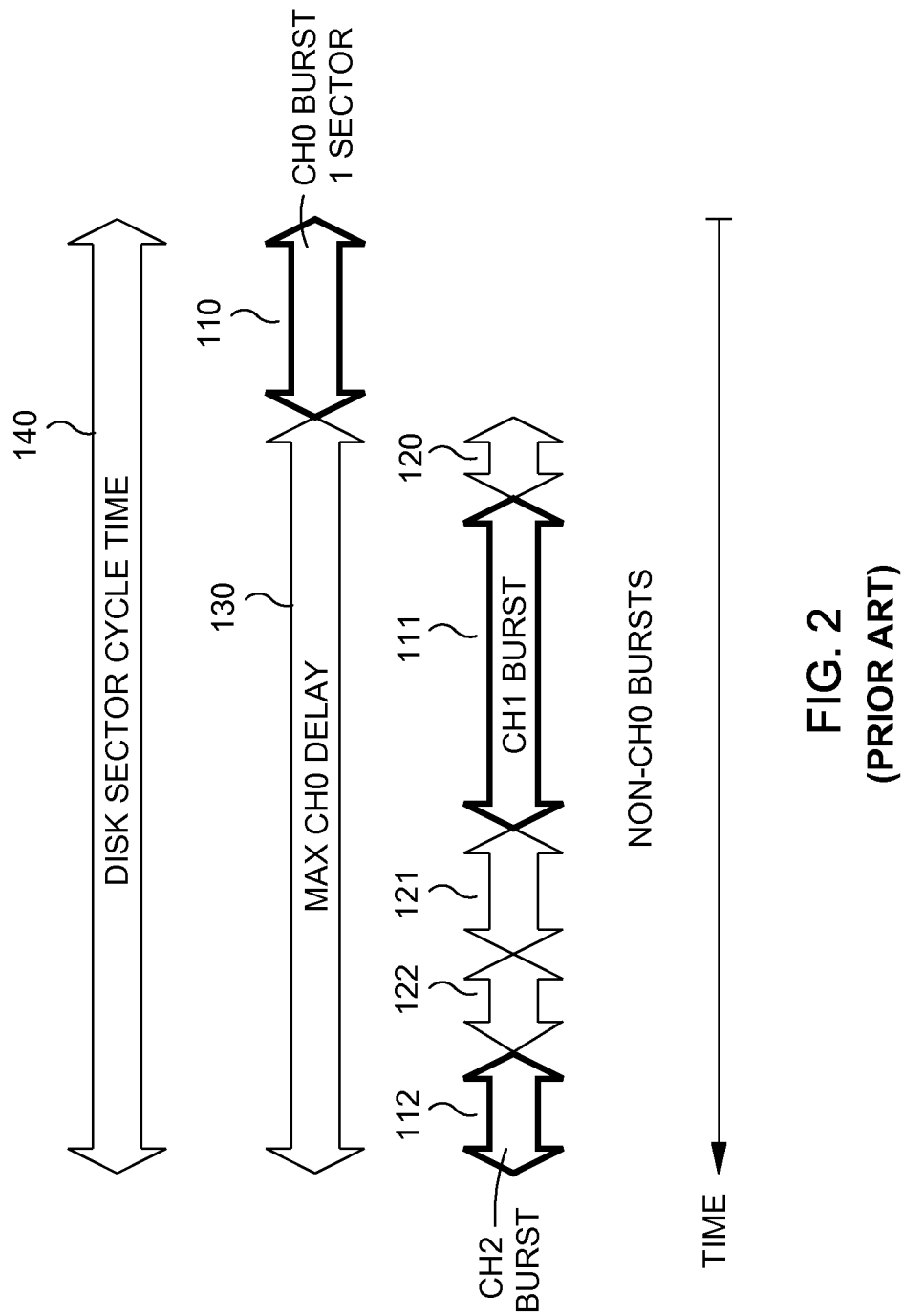
FIG. 2 is a time-line illustrating an arbitration round-trip time in a conventional hard disk drive.
Figure 3:
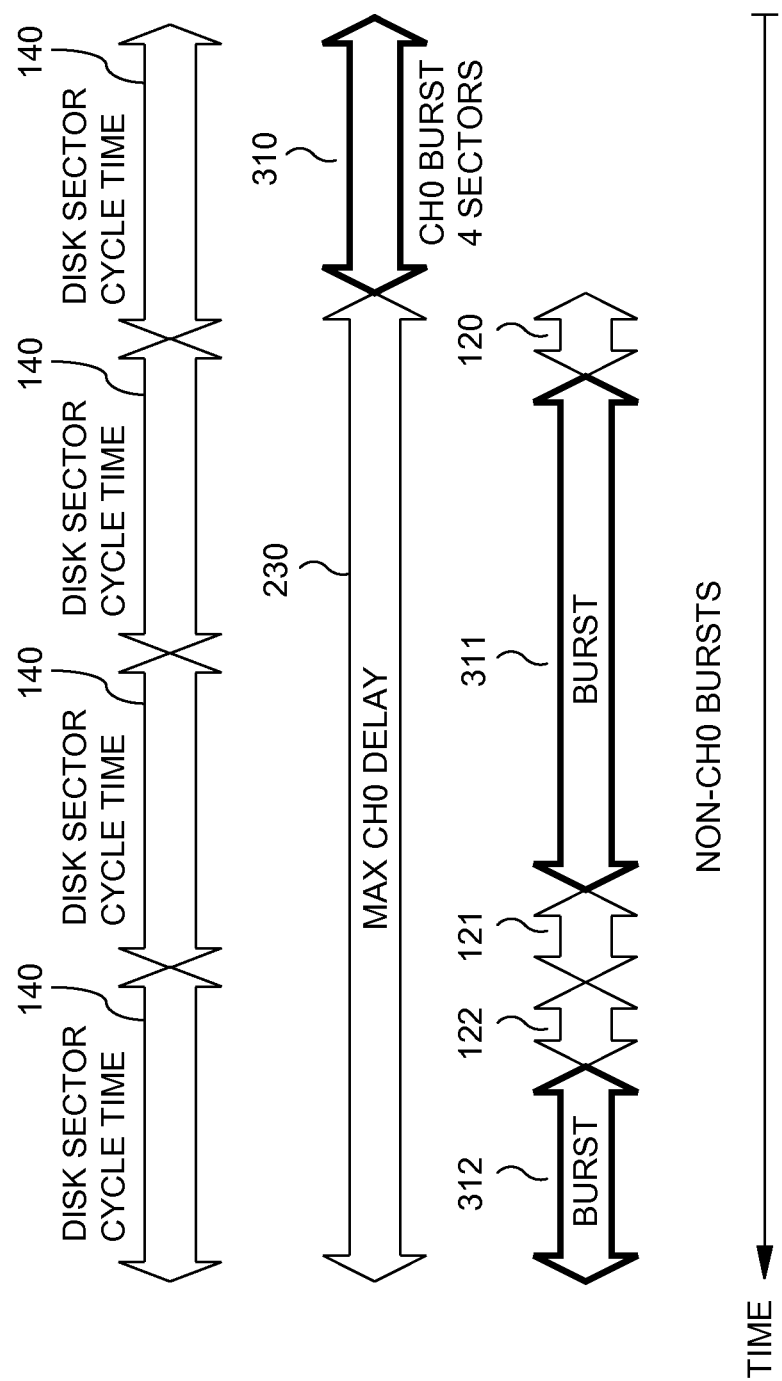
FIG. 3 is a time-line illustrating an arbitration algorithm, in accordance with an embodiment of the invention.

After the second tenure expires, processes can be performed within additional tenures (e.g., 312) until the first arbitration round-trip is completed (e.g., after time 230 of FIG. 3). In the example embodiment, wherein the CH0 process performs a four sector burst, the first arbitration round trip completes before storage medium 470 has moved a distance corresponding to four sectors (e.g., after time 140 of FIG. 3). Thereafter, successive arbitration round-trips (beginning with CH0 tenures) are performed, and the read operation continues similarly as described above, with regard to the first arbitration round-trip, until the read operation completes.

Although subsequent arbitration round-trips always commence with a CH0 tenure, the following tenures can service channels that differ from prior arbitration round trips. For example, an arbitration round-trip can commence with a CH0 tenure followed by overhead processing and a CH1 tenure, and a subsequent arbitration round-trip can commence with a CH0 tenure followed by overhead processing and a CH2 tenure.

To write data to storage medium 407, host 403 sends a write command to buffer controller 430 (through host interface 410 and multi-channel bus 440), and buffer controller 430 stores the write command in buffer memory 401. In response, microprocessor 404 retrieves the write command from buffer memory 401 via buffer controller 430, and initializes buffer controller 430 to perform the write operation.

Microprocessor 404 initializes circuitry of buffer controller 430, which initializes host interface 410 to begin a write operation to write data to storage device 402, according to an example embodiment of the invention. After host interface 410 is initialized, the write operation begins with host interface 410 instructing host 403 to send data. In response, host 403 sends data through port 411 and/or port 412. Circuitry of host interface 410 stores data received through port 411 in FIFO queue 471, and stores data received through port 412 in FIFO queue 472.

After FIFO queue 471 contains data corresponding to a predetermined number of sectors of storage medium 407, CH1 circuitry 452 performs a CH1 burst process that transfers data stored in FIFO queue 471, to buffer memory 401 (through multi-channel bus 440 and buffer controller 430). After FIFO queue 472 contains data corresponding to a predetermined number of sectors of storage medium 407, CH2 circuitry 453 performs a CH2 burst process that transfers data stored in FIFO queue 472, to buffer memory 401 (through multi-channel bus 440 and buffer controller 430). Data can be received by host interface 410, and stored in queues 471 and/or 472, while the CH1 and/or CH2 burst processes are performed.

After buffer 401 contains a predetermined amount of data, microprocessor 404 initializes arbitration circuitry 431 and configuration registers 432 (of buffer controller 430) to begin a first arbitration round-trip of the write operation, wherein the first arbitration tenure is a tenure of CH0 DMA channel 460 (i.e. a CH0 tenure).

To begin the first CH0 tenure (e.g., 310), buffer controller 430 initializes storage medium interface 420 to perform a read operation to read data from buffer memory 401. After storage device controller 420 is initialized, the read operation begins with CH0 circuitry 450 performing a CH0 burst process that transfers the data (corresponding to the data written to buffer memory 401 by host interface 410) stored in buffer memory 401 to FIFO queue 470 (through buffer controller 430 and multi-channel bus 440) in a multi-sector (e.g., four sector) burst. In an example embodiment of the invention, if data or space runs out in FIFO queue 470, CH0 circuitry 450 stops bursting After the multi-sector burst has completed, the first CH0 tenure expires and another tenure begins. During the CH0 tenure and/or other tenures (e.g., 311 and 312), ECC circuitry 422 reads data stored in FIFO queue 470, generates ECC information based on the data read from FIFO queue 470, and sends the generated ECC information to disk formatting circuitry 421. Disk formatting circuitry 421 reads data stored in FIFO queue 470, appends ECC information received from ECC circuitry 422 to the data read from FIFO queue 470, and transfers the data (including appended ECC information) to storage device 402.

After tenure CH0 expires, circuitry of buffer controller 430 (e.g., arbitration circuitry 431) is initialized to begin a second tenure (e.g., a CH1 or a CH2 tenure) during which circuitry of host interface 410 (e.g., 452 or 453) performs a process (e.g., a CH1 or a CH2 process) to transfer additional data received from host 403, and stored in host interface 410 (e.g., in FIFO queue 471 and/or 472), to buffer memory 401.

To begin the second tenure (e.g., 311), buffer controller 430 initializes host interface 410 for transferring data from host 403 to buffer memory 401. For example, during a CH1 tenure, CH1 circuitry 452 performs a CH1 burst process that transfers the data stored in FIFO queue 471 to buffer memory 401 (through multi-channel bus 440 and buffer controller 430) until either all of the data is transferred, or the CH1 tenure expires. The lengths of the tenures other than the CH0 tenure are configured such that the maximum arbitration round-trip time is less than (or equal to) the time taken by storage medium 407 to move a distance corresponding to N sectors (e.g., disk sector cycle time 140) in which N is greater than one.

Similarly, during a CH2 tenure, CH2 circuitry 453 performs a CH2 burst process that transfers the data stored in FIFO queue 472 to buffer memory 401 (through multi-channel bus 440 and buffer controller 430) until either all of the data is transferred, or the CH2 tenure expires.

Buffer controller 430 can be constructed to control the flow of data transferred from host interface 410 to buffer memory 401, and from buffer memory 401 to storage medium interface 420, such that host interface 410 does not overwrite data in buffer memory 401 that has not been written to storage device 402.

After the second tenure expires, processes can be performed within additional tenures (e.g., 312) until the first arbitration round-trip is completed (e.g., within time 230 of FIG. 3). In the example embodiment, after the second tenure (e.g., 311) expires, other tenures (e.g., 312) may begin, during which circuitry (e.g., CH3 circuitry 451) can perform, for example, a RAID process (e.g., XOR process) on data stored in buffer memory 401.

In the example embodiment, wherein the CH0 process performs a four sector burst, the first arbitration round trip completes before storage medium 470 has moved a distance corresponding to four sectors (e.g., after time 140 of FIG. 3). Thereafter, successive arbitration round-trips (beginning with CH0 tenures) are performed, and the write operation continues similarly as described above, with regard to the first arbitration round-trip, until the write operation completes.

CH0 circuitry 450 includes independent state machines 500 and 520, as shown in FIGS. 5A and 5B, respectively. State machine 500 of FIG. 5A prepares for the next sector during a multi-sector burst. State machine 520 of FIG. 5B bursts through sector boundaries without pausing, unless CH0 circuitry performs an address change to use a different address of buffer memory 401.

State machine 500 of FIG. 5A starts in state 501. When a burst starts, state machine 500 enters state 502, where it determines whether predetermined conditions are met before entering state 503, where the next sector in the burst is initialized. After the next sector is initialized, state machine 500 returns to state 501 where it waits for another burst to begin.

State machine 520 of FIG. 5B starts in idle state 521 until a burst begins. After a burst begins, state machine 520 enters state 522 where a burst is performed until a sector boundary is reached. If a sector boundary is reached, state machine 520 enters state 523, where state machine 520 determines whether to enter state 524, return to state 522, or return to state 521. If the burst is complete, state machine 520 returns to idle state 521.

If bursting continues, and the address of buffer memory 401 does not need to be changed, state machine 520 returns to state 522 where state machine 520 continues bursting. If bursting continues, but the address of buffer memory 401 needs to be changed, state machine 520 enters state 524 where state machine 520 pauses to change the address, and then returns to state 522 to continue bursting.

Figure 6A:
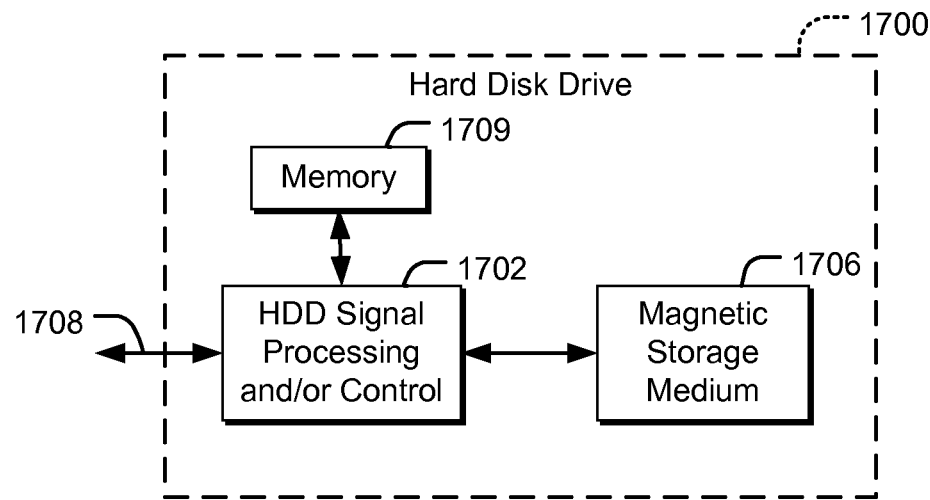
FIG. 6A is a block diagram of an embodiment of the invention in a hard disk drive.

Referring now to FIGS. 6A-7H, various exemplary implementations of the present invention are shown. Referring to FIG. 6A, the present invention may be embodied as a controller in a hard disk drive 1700. The present invention may implement either or both signal processing and/or control circuits, which are generally identified in FIG. 6A at 1702. In some implementations, signal processing and/or control circuit 1702 and/or other circuits (not shown) in HDD 1700 may process data, perform coding and/or encryption, perform calculations, and/or format data that is output to and/or received from a magnetic storage medium 1706.

HDD 1700 may communicate with a host device (not shown) such as a computer, mobile computing devices such as personal digital assistants, cellular phones, media or MP3 players and the like, and/or other devices via one or more wired or wireless communication links 1708. HDD 1700 may be connected to memory 1709, such as random access memory (RAM), a low latency nonvolatile memory such as flash memory, read only memory (ROM) and/or other suitable electronic data storage.

Figure 6B:
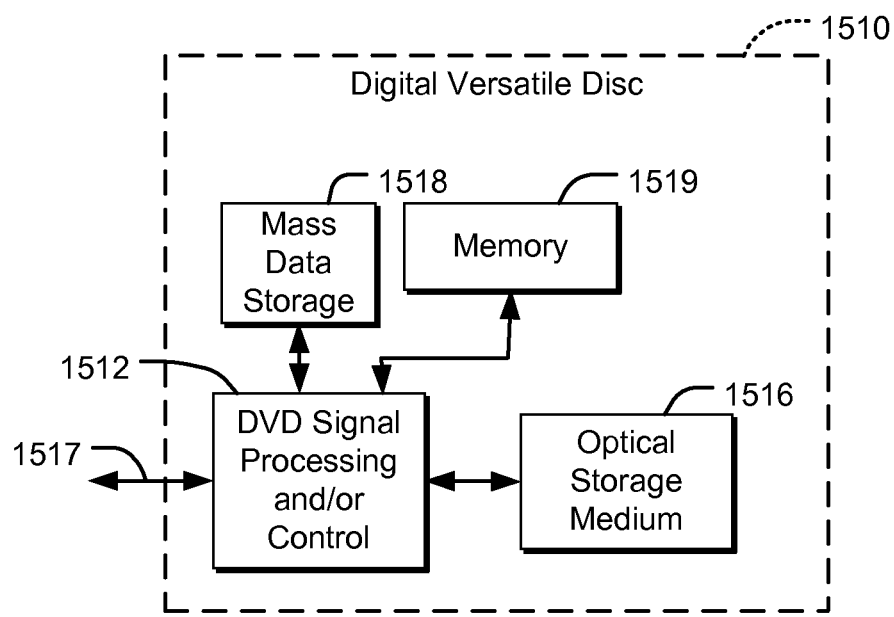
FIG. 6B is a block diagram of an embodiment of the invention in a DVD drive.

Referring now to FIG. 6B, the present invention may be embodied as a controller in a digital versatile disc (DVD) drive 1510. The present invention may implement either or both signal processing and/or control circuits, which are generally identified in FIG. 6B at 1512, and/or mass data storage 1518 of DVD drive 1510. Signal processing and/or control circuit 1512 and/or other circuits (not shown) in DVD 1510 may process data, perform coding and/or encryption, perform calculations, and/or format data that is read from and/or data written to an optical storage medium 1516. In some implementations, signal processing and/or control circuit 1512 and/or other circuits (not shown) in DVD 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD 1510 may communicate with mass data storage 1518 that stores data in a nonvolatile manner. Mass data storage 1518 may include a hard disk drive (HDD) such as that shown in FIG. 6A. The HDD may be a mini HDD that includes one or more platters having a diameter that is smaller than approximately 1.8". DVD 1510 may be connected to memory 1519, such as RAM, ROM, low latency nonvolatile memory such as flash memory, and/or other suitable electronic data storage.

Figure 6C:
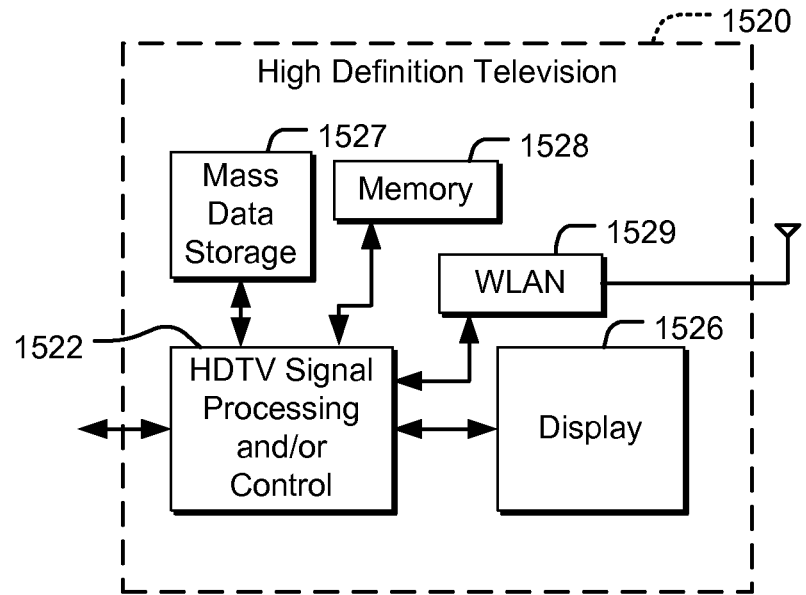
FIG. 6C is a block diagram of an embodiment of the invention in a high definition television (HDTV).

Referring now to FIG. 6C, the present invention may be embodied as a controller in a high definition television (HDTV) 1520. The present invention may implement either or both signal processing and/or control circuits, which are generally identified in FIG. 6C at 1522, a WLAN interface and/or mass data storage of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via a WLAN network interface 1529.

Figure 6D:
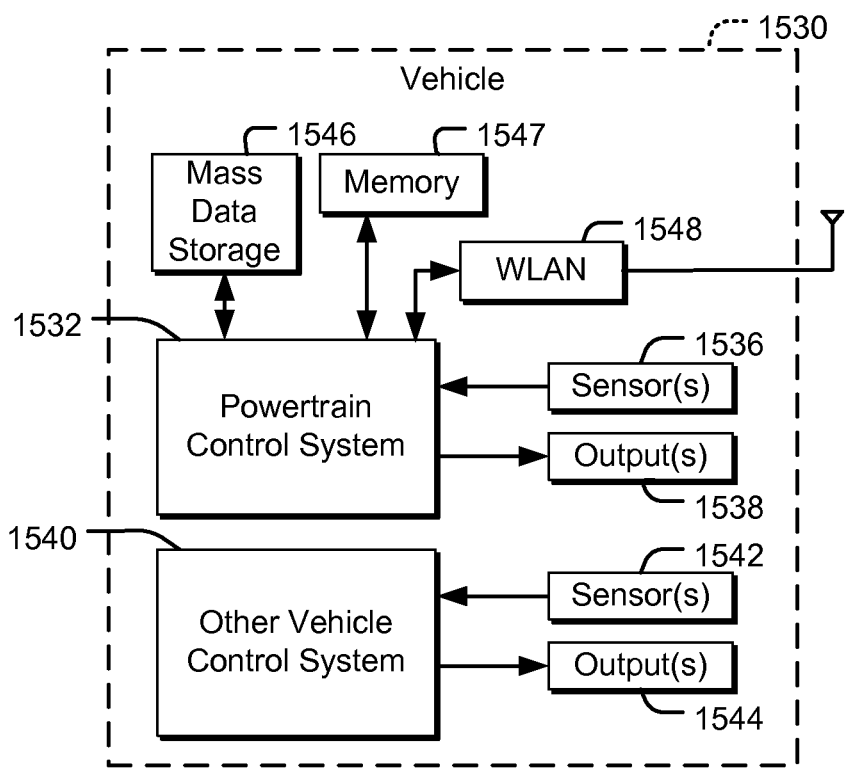
FIG. 6D is a block diagram of an embodiment of the invention in a vehicle control system.

Referring now to FIG. 6D, the present invention may be embodied as a controller in a control system of a vehicle 1530, a WLAN interface and/or mass data storage of the vehicle control system. In some implementations, the present invention implements a powertrain control system 1532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via a WLAN network interface 1548. The control system 1540 may also include mass data storage, memory and/or a WLAN interface (all not shown).

Figure 6E:
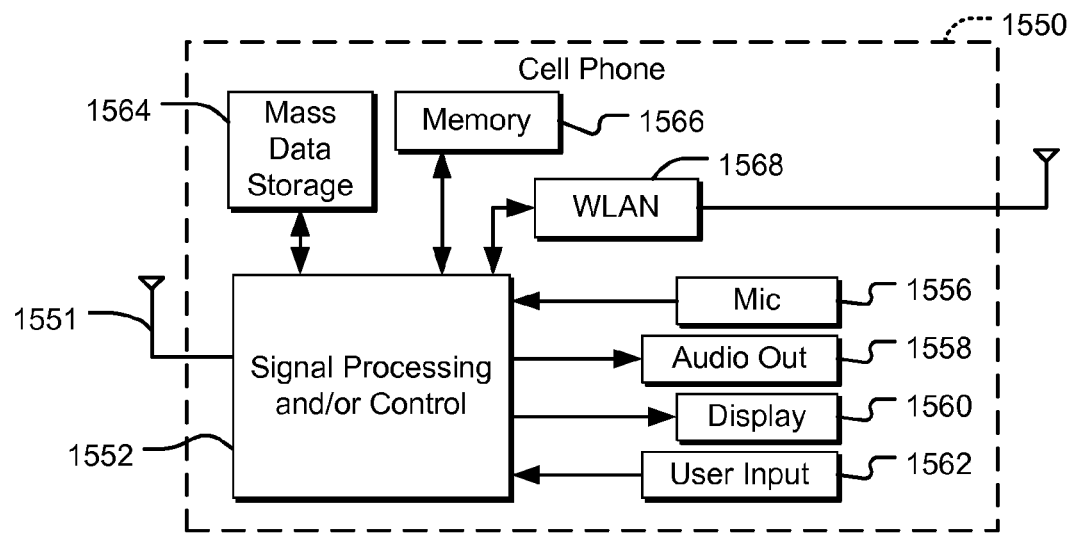
FIG. 6E is a block diagram of an embodiment of the invention in a cellular or mobile phone.

Referring now to FIG. 6E, the present invention may be embodied as a controller in a cellular phone 1550 that may include a cellular antenna 1551. The present invention may implement either or both signal processing and/or control circuits, which are generally identified in FIG. 6E at 1552, a WLAN interface and/or mass data storage of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices for example hard disk drives HDD and/or DVDs. At least one HDD may have the configuration shown in FIG. 5A and/or at least one DVD may have the configuration shown in FIG. 6B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via a WLAN network interface 1568.

Figure 6F:
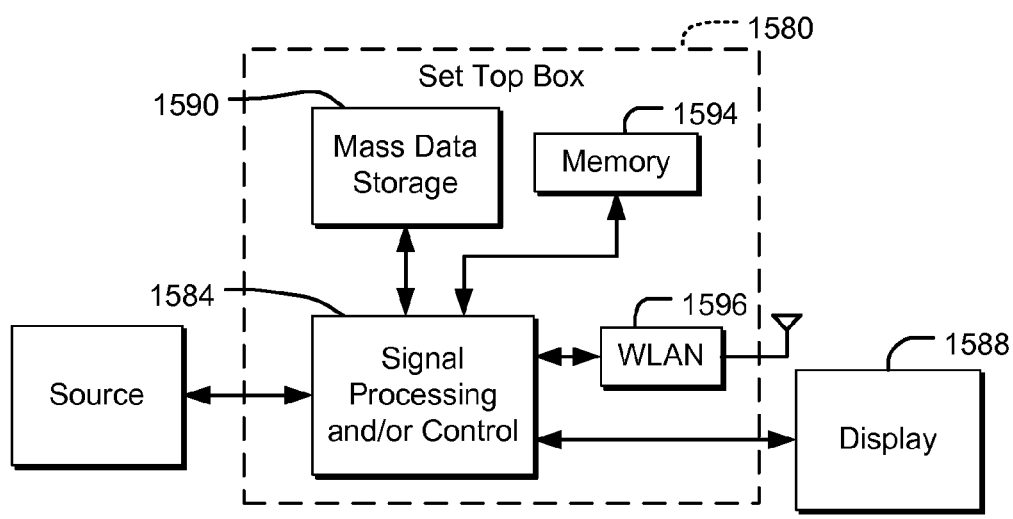
FIG. 6F is a block diagram of an embodiment of the invention in a set-top box (STB).

Referring now to FIG. 6F, the present invention may be embodied as controller in a set top box 1580. The present invention may implement either or both signal processing and/or control circuits, which are generally identified in FIG. 6F at 1584, a WLAN interface and/or mass data storage of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via a WLAN network interface 1596.

Figure 6G:
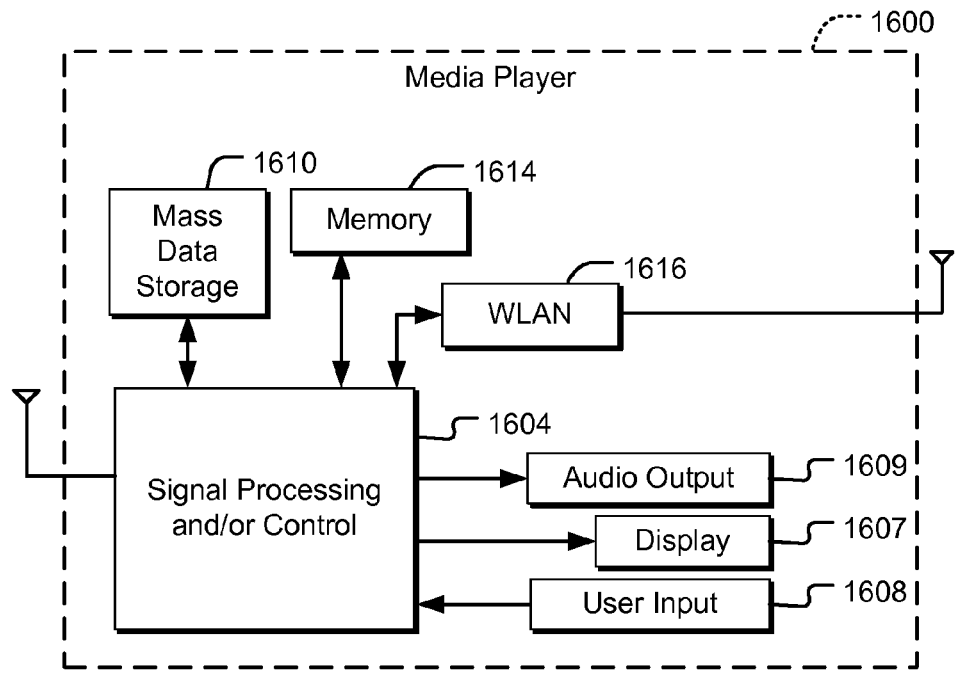
FIG. 6G is a block diagram of an embodiment of the invention in a media player.

Referring now to FIG. 6G, the present invention may be embodied as a controller in a media player 1600. The present invention may implement either or both signal processing and/or control circuits, which are generally identified in FIG. 6G at 1604, a WLAN interface and/or mass data storage of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 6A and/or at least one DVD may have the configuration shown in FIG. 6B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via a WLAN network interface 1616. Still other implementations in addition to those described above are contemplated.

Figure 6H:
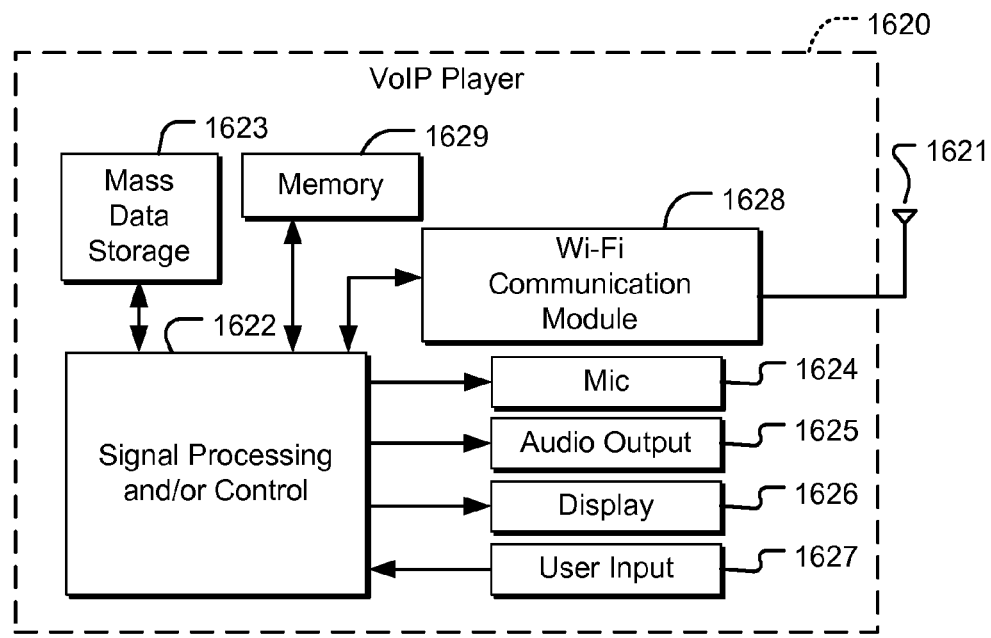
FIG. 6H is a block diagram of an embodiment of the invention in a VoIP phone.

Referring to FIG. 6H, the present invention may be embodied as a controller in a Voice over Internet Protocol (VoIP) phone 1620 that may include an antenna 1621. The present invention may implement either or both signal processing and/or control circuits, which are generally identified in FIG. 6H at 1622, a wireless interface and/or mass data storage of the VoIP phone 1623. In some implementations, VoIP phone 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP phone 1620 may process data, perform coding and/or encryption, perform calculations, format data and/or perform other VoIP phone functions.

VoIP phone 1620 may communicate with mass data storage 1623 that stores data in a nonvolatile manner such as optical and/or magnetic storage devices, for example hard disk drives HDD and/or DVDs. At least one HDD may have the configuration shown in FIG. 11A and/or at least one DVD may have the configuration shown in FIG. 6B. The HDD may be a mini HDD that includes one or more platters having a diameter that is smaller than approximately 1.8". VoIP phone 1620 may be connected to memory 1629, which may be a RAM, ROM, low latency nonvolatile memory such as flash memory and/or other suitable electronic data storage. VoIP phone 1620 is configured to establish communications link with a VoIP network (not shown) via Wi-Fi communication module 1628.

The exemplary embodiments of the invention have been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for transferring, via a controller, data from a storage medium of a storage device to a host, wherein the controller includes (i) an interface to the storage medium, (ii) an interface to the host, and (iii) a multi-channel bus, and wherein the storage device further includes a read assembly, the method comprising:
   receiving, at the controller from the host, a command to read data from the storage medium;
   in response to the controller receiving the command to read data from the storage medium, the controller enabling, through the interface to the storage medium, the read assembly to read first data from N number of sectors of the storage medium, wherein the first data corresponds to data to be read from the storage medium as indicated in the command, and wherein N is a positive integer;
   receiving, by a first queue included in a first channel circuit coupled to a first channel of the multi-channel bus, the first data from the read assembly, wherein multi-channel bus comprises at least (i) the first channel and (ii) a second channel, wherein the first channel circuit is included in the interface to the storage medium, and wherein the storage medium is different and separate from each of (i) the interface to the storage medium and (ii) the interface to the host;
   arbitrating access to a buffer memory via the multi-channel bus, wherein the buffer memory is coupled to the controller, and wherein access to the buffer memory is arbitrated in a plurality of tenures assigned to a corresponding plurality of channels of the multi-channel bus;
   during a first tenure of the plurality of tenures, transferring, to the buffer memory, the first data via the first channel from the first queue included in the first channel circuit;

subsequent to the first tenure and during a second tenure of the plurality of tenures, transferring, by a second channel circuit coupled to the second channel of the multi-channel bus, the first data from the buffer memory to a second queue via the second channel, wherein the second channel circuit is included in the interface to the host, and wherein the second queue is included in the second channel circuit; and transferring the first data from the second queue to the host.

2. The method of claim', further comprising:
during the second tenure while the first data is being transferred from the buffer memory to the second queue via the second channel,
(A) the storage controller enabling, through the interface to the storage medium, the read assembly to read second data from another N number of sectors of the storage medium, wherein the second data corresponds to the received read command, and
(B) receiving, by the first queue, the second data read by the read assembly.

3. The method of claim', wherein:
the interface to the storage medium further comprises a disk formatting circuit; and
receiving, by the first queue, the first data read by the read assembly further includes the disk formatting circuit
receiving the first data read from the storage medium, and
transferring, to the first queue, the first data read from the storage medium.

4. The method of claim 1, wherein:
the first channel circuit includes an error correction code (ECC) circuit; and
receiving, by the first queue included in the first channel circuit, the first data read by the read assembly further includes the ECC circuit
decoding and correcting the first data read by the read assembly, wherein the ECC circuit has a ECC queue to queue the first data while or prior to the ECC circuit decoding and correcting the first data.

5. The method of claim 4, wherein:
a size of the ECC queue is greater than a size of N number of sectors of the storage medium.

6. The method of claim 4, wherein:
a length of the first tenure of the plurality of tenures is pre-designated by the first queue such that that transfer of the first data from the first queue to the buffer memory is completed within the first tenure of the plurality of tenures; and
a size of the first queue is equal to or greater than a size of (N+2) number of sectors of the storage medium.

7. The method of claim 1, wherein:
the multi-channel bus is a direct memory access (DMA) bus;
the first channel is a first DMA channel; and
the second channel is a second DMA channel.

8. The method of claim 1, wherein transferring the first data from the second queue to the host comprises:
transferring the first data from the second queue to the host during or subsequent to the second tenure of the plurality of tenures.

9. The method of claim 1, wherein the buffer memory includes a Random Access Memory (RAM) module.

10. A controller configured to transfer data from a storage medium of a storage device to a host, wherein the storage device includes a read assembly, and wherein the controller comprises:

a buffer controller configured to arbitrate access to a buffer memory via a multi-channel bus, wherein the multi-channel bus comprises at least (i) a first channel and (ii) a second channel, wherein the buffer memory is coupled to the controller, and wherein access to the buffer memory is arbitrated in a plurality of tenures assigned to a corresponding plurality of channels of the multi-channel bus;

an interface to the storage medium, wherein the interface to the storage medium is different and separate from the storage medium, wherein the interface to the storage medium comprises a first channel circuit coupled to the first channel of the multi-channel bus, and wherein the first channel circuit comprises a first queue; and an interface to the host, wherein the interface to the host is different and separate from the storage medium, wherein the interface to the host comprises a second channel circuit coupled to the second channel of the multi-channel bus, and wherein the second channel circuit comprises a second queue, wherein the interface to the host is configured to receive, from the host, a command to read data from the storage medium, wherein the interface to the storage medium is configured to, in response to the command to read data from the storage medium,
(A) enable the read assembly to read first data from N number of sectors of the storage medium, wherein the first data corresponds to the received read command, and wherein N is a positive integer,
(B) receive, in the first queue, the first data from the read assembly, and
(C) during a first tenure of the plurality of tenures, transfer, to the buffer memory, the first data via the first channel from the first queue, and wherein the interface to the host is configured to
(A) subsequent to the first tenure and during a second tenure of the plurality of tenures, transfer the first data from the buffer memory to the second queue via the second channel, and
(B) transfer the first data from the second queue to the host.

11. The controller of claim 10, wherein the interface to the storage medium is configured to:
during the second tenure while the first data is being transferred from the buffer memory to the second queue via the second channel,
(A) enable the read assembly to read second data from another N number of sectors of the storage medium, wherein the second data corresponds to the received read command, and
(B) receive, by the first queue, the second data read by the read assembly.

12. The controller of claim 10, wherein the interface to the storage medium further comprises a disk formatting circuit, and wherein the interface to the storage medium is configured to receive, in the first queue, the first data from the read assembly by:
receiving, by the disk formatting circuit, the first data read from the storage medium; and
transferring, by the disk formatting circuit to the first queue, the first data read from the storage medium.

13. The controller of claim 10, wherein the first channel circuit includes an error correction code (ECC) circuit, and wherein the interface to the storage medium is configured to receive, in the first queue, the first data from the read assembly by:

decoding and correcting, by the ECC circuit, the first data read by the read assembly, wherein the ECC circuit has a ECC queue to queue the first data while or prior to the ECC circuit decoding and correcting the first data.

14. The controller of claim 13, wherein:
a size of the ECC queue is greater than a size of N number of sectors of the storage medium.

15. The controller of claim 13, wherein:
a length of the first tenure of the plurality of tenures is pre-designated by the first queue such that that transfer of the first data from the first queue to the buffer memory is completed within the first tenure of the plurality of tenures; and
a size of the first queue is equal to or greater than a size of (N+2) number of sectors of the storage medium.

16. The controller of claim 10, wherein:
the multi-channel bus is a direct memory access (DMA) bus;
the first channel is a first DMA channel; and
the second channel is a second DMA channel.

17. The controller of claim 10, wherein the interface to the host is configured to transfer the first data from the second queue to the host by:
transferring the first data from the second queue to the host during or subsequent to the second tenure of the plurality of tenures.

18. The controller of claim 10, wherein the buffer memory includes a Random Access Memory (RAM) module.

* * * * *